United States Patent [19]

Weinstein et al.

[11] Patent Number: 4,555,058

[45] Date of Patent: Nov. 26, 1985

[54] ROTARY ATOMIZER COATER

[75] Inventors: Richard Weinstein; James W. Davis, both of Toledo, Ohio; Robert K. Campbell, Temperance, Mich.

[73] Assignee: Champion Spark Plug Company, Toledo, Ohio

[21] Appl. No.: 539,283

[22] Filed: Oct. 5, 1983

[51] Int. Cl.[4] .......................... B05B 3/10; F16J 15/16

[52] U.S. Cl. .................................... 239/223; 239/296; 239/703; 384/482

[58] Field of Search ................ 239/129, 132.3, 214.15, 239/222–224, 296, 700–703; 277/96, 96.1, 96.2; 384/139, 140, 481, 482

[56] References Cited

U.S. PATENT DOCUMENTS

| | | | |
|---|---|---|---|
| 2,375,884 | 5/1945 | Arvins et al. | 239/223 |
| 2,504,216 | 4/1950 | Morton | 239/296 |
| 2,584,973 | 2/1952 | Andermatt | 239/223 X |
| 2,668,068 | 2/1954 | Bredemeier | 277/96 X |
| 2,799,532 | 7/1957 | Smart | 239/223 |
| 2,901,177 | 8/1959 | Norris | 239/223 X |
| 3,169,809 | 2/1965 | Pendleton | 384/482 |
| 4,214,708 | 7/1980 | Lacchia | 239/223 X |

FOREIGN PATENT DOCUMENTS

| | | | |
|---|---|---|---|
| 2086765 | 5/1982 | United Kingdom | 239/223 |

*Primary Examiner*—Johnny D. Cherry

*Attorney, Agent, or Firm*—Emch, Schaffer Schaub & Porcello Co.

[57] ABSTRACT

A coating applicator is disclosed which includes a rotary atomizer on a driven shaft. The shaft operates at high speeds. Coating material is supplied to the rotary atomizer. A pair of spaced bearings rotatably mount the shaft and a seal assembly is positioned between the rotary atomizer and the front bearing. The seal assembly includes a bearing cover having a cutting edge. A mating cap member surrounds the shaft and has a sealing shoulder which is engaged by the cutting edge. Exhaust air is used to cool the bearings, pressure the interior of the applicator and enhance the seal assembly.

9 Claims, 8 Drawing Figures

FIG. 1
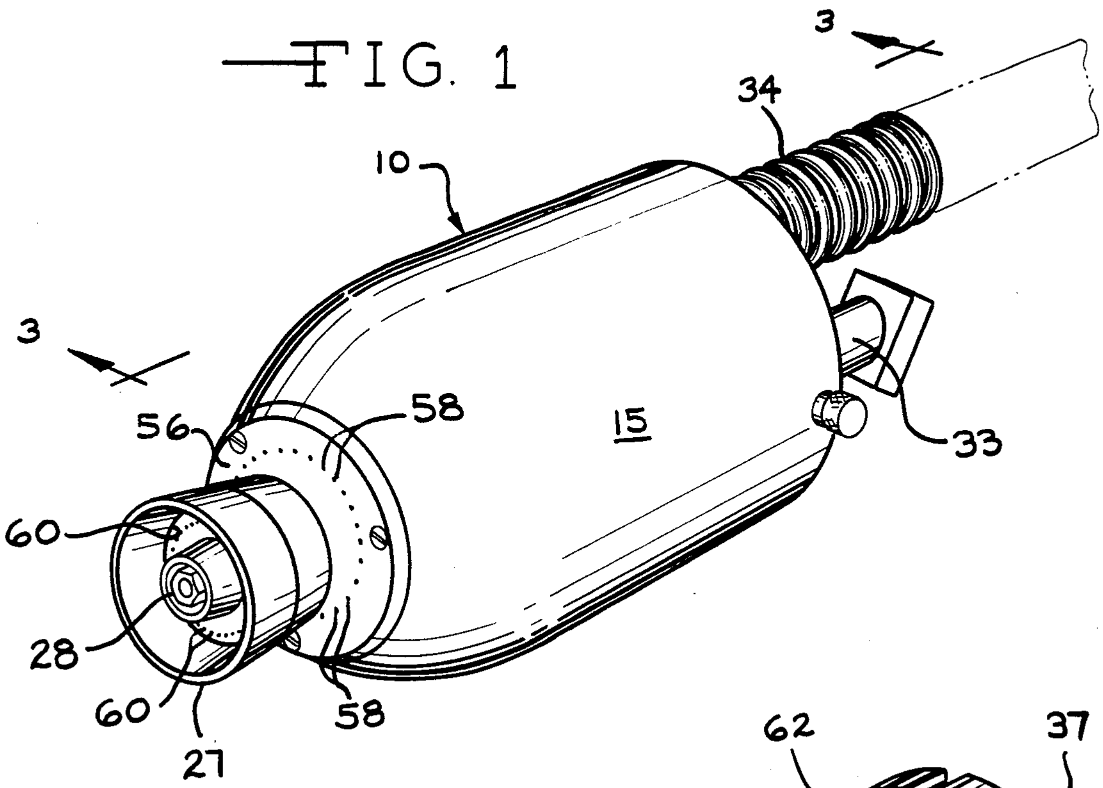
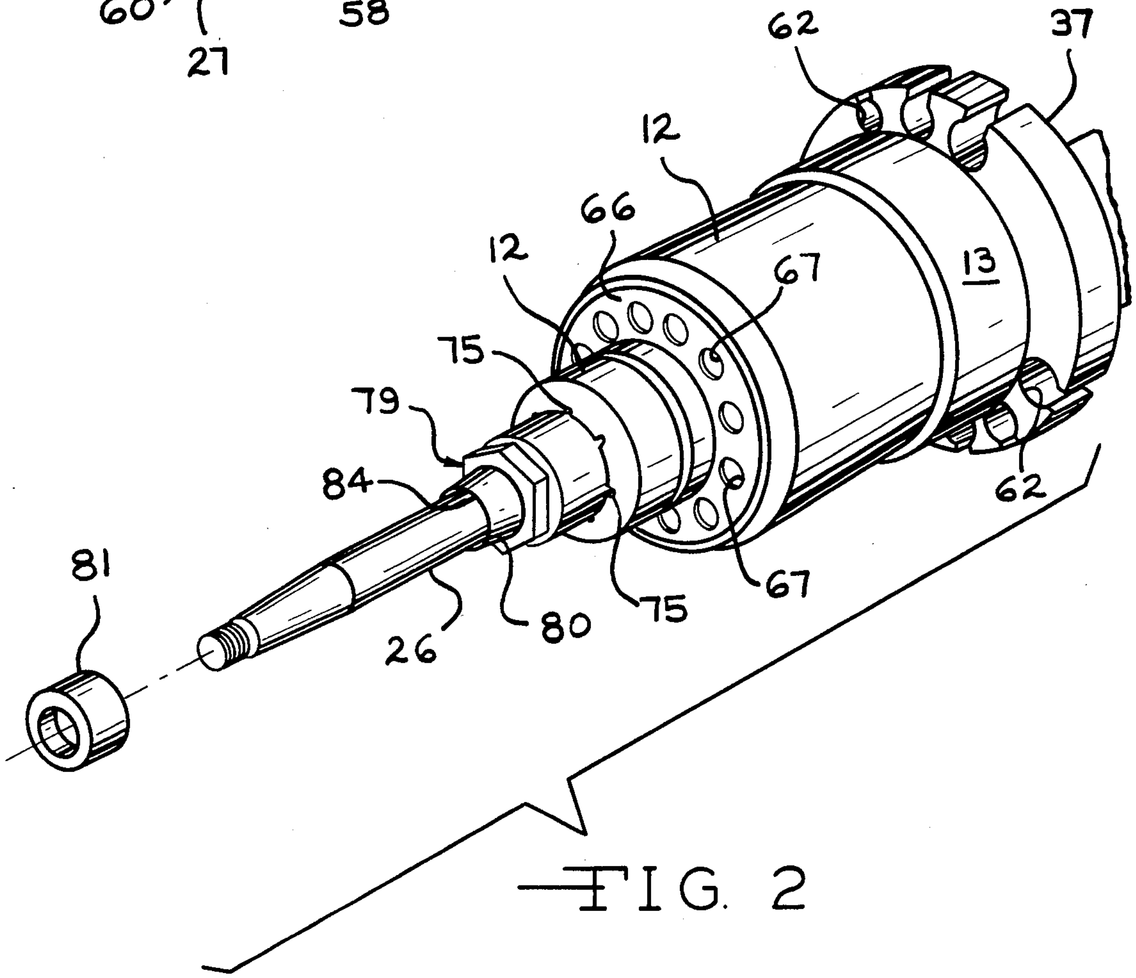
FIG. 2

ROTARY ATOMIZER COATER

BACKGROUND OF THE INVENTION

This invention relates to a coating apparatus and more particularly to an improved rotary atomizer coater for depositing paint and similar material on a workpiece. The present invention is particularly adaptable for use on a robot mounting.

In one type of prior art coating apparatus for paint and the like, a rotary atomizer, such as a disk or bell is driven by a drive means, such as an air motor. The air motor may be an air driven turbine. It is known in the prior art that a governor may be built to an air turbine for regulating the speed of the turbine output shaft. Such a governor unit is illustrated, for example, in U.S. Pat. No. 3,708,240. The bell is rotated at high speeds, normally between 10,000 and 40,000 rpm.

Paint is delivered to the inner surface of the rapidly rotating bell and is thrown off in small particles through centrifugal force. The surface of the bell is charged to a high voltage, normally between 30 KV and 100 KV to electrostatically charge the paint particles. The atomized charged paint particles are directed at and coat the workpiece by the charge on the paint particles and in some embodiments by a surrounding stream of air discharged from the rotary atomizer coater.

When a rotary atomizer coater is charged to the high voltages required, it is necessary to establish a non-conductive path between the charged, metallic shaft and rotating bell and any grounded object, for example, the arm of an industrial robot.

The high rotational speed of the rotary atomizer bell coupled with the use of coating material and solvents has often created bearing problems in prior art devices.

SUMMARY OF THE INVENTION

According to the present invention, a rotary atomizer coater is provided which includes a novel seal assembly which tends to prevent coating materials, solvent and solvent fumes from attacking the shaft bearings.

In addition, the metallic shaft and bearings are positioned within a non-metallic housing assembly, which is then positioned within a non-metallic outer shroud. The coating applicator, according to the present invention establishes a sufficiently long dialectric path between the metallic bell and ground, while at the same time maintaining a relatively compact overall configuration.

In one embodiment of the present invention, a seal air passageway is provided between the exhaust side of the turbine and the seal assembly. A back pressure is established on the exhaust air and a portion of the exhaust air directed to the seal assembly to enhance the seal and prevent coating material, solvent and solvent fumes from attaching the front bearing. This exhaust air also cools the bearings and pressurizes the interior of the shroud to prevent the entry of undesirable particles. It has been found that the operating life of the present rotary atomizer coater is greatly increased.

Accordingly, it is the object of the present invention to provide an improved rotary atomizer coater.

Other objects and advantages of the invention will become apparent from the following detailed description, with reference being made to the accompanying drawings.

BRIEF DESCRIPTIONS OF THE DRAWINGS

FIG. 1 is a perspective view of a rotary atomizer coater, according to the present invention;

FIG. 2 is an exploded view of a portion of the rotary atomizer coater shown in FIG. 1, with the bell and shroud removed;

DETAILED DESCRIPTION OF THE PREFERRED EMBODIMENT

Figure 3:
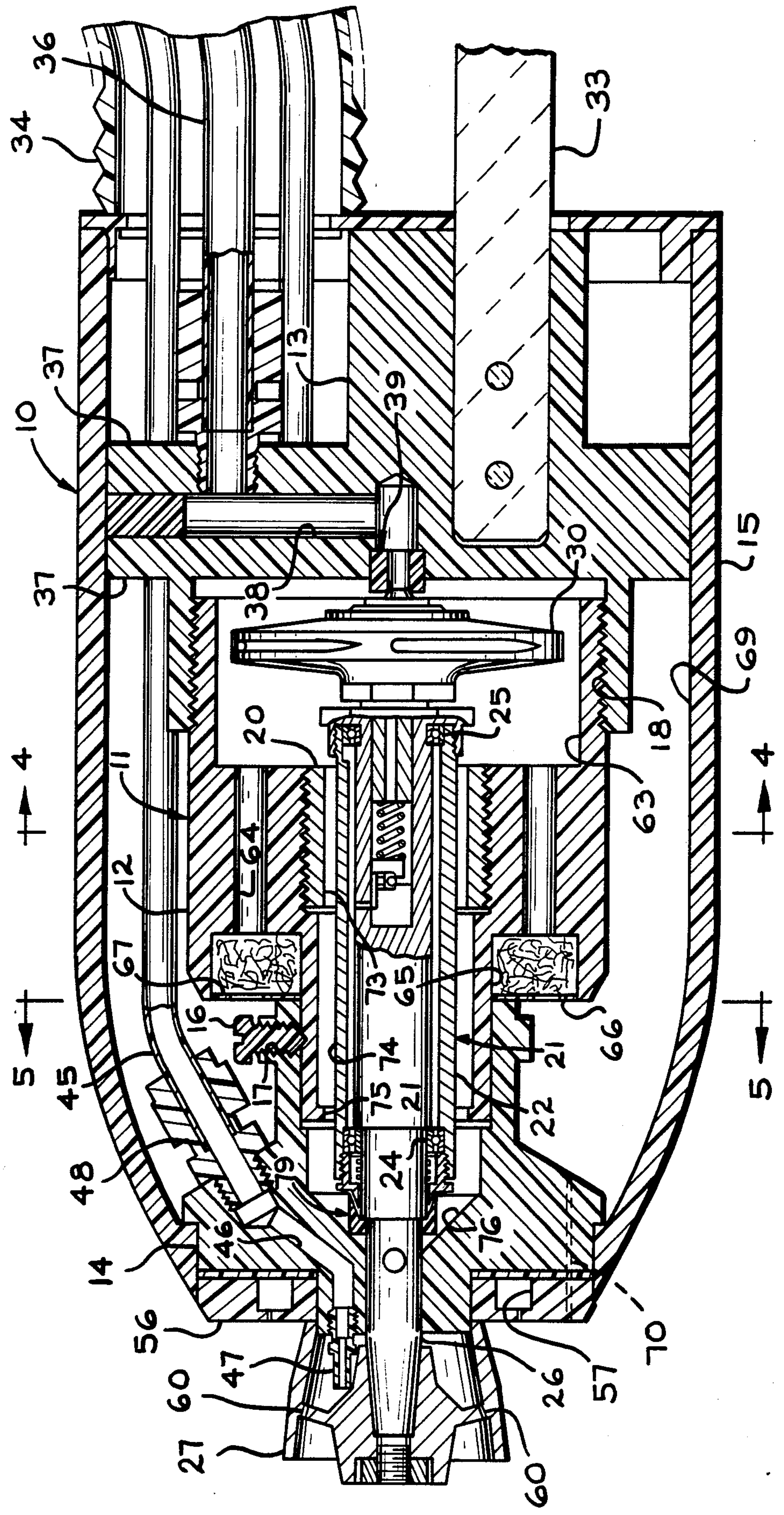
FIG. 3 is a sectional view, shown on an enlarged scale, and taken along the line 3—3 of FIG. 1.

A rotary atomizer coater, according to the present invention, is generally indicated by the reference number 10. The coater 10 includes a housing assembly 11 consisting of a front housing assembly 12, a rear housing assembly 13 and a manifold assembly 14. The entire housing assembly 11 is surrounded by an outer shroud 15. The front housing assembly 12, rear housing assembly 13, manifold assembly 14 and shroud are each constructed of a non-metallic (plastic) dialectric material. The manifold assembly 14 is retained on the front housing assembly 12 by non-metallic screws 16 which are positioned in threaded openings 17. The front housing assembly 12 is connected to the rear housing assembly 13 by threads 18. A support collar 20 is threadably engaged in an opening within the front housing assembly 12 and mounts a shaft assembly 21. The support collar 20 and shaft assembly 21 are metallic. The shaft assembly 21 includes a cylindrical sleeve 22, spaced front and rear bearings 24 and 25, and a stepped shaft 26. The stepped shaft 26 mounts a rotary bell 27. A nut 28 holds the bell 27 on the shaft 26. In the present enbodiment, the bearings 24 and 25 are angular contact bearings, however, other types of bearings may be utilized.

Drive means are mounted at the rear end of the shaft 26. Specifically, an air driven turbine 30 is used to drive the shaft 26. Details of the operation of the air turbine 30 are described in fuller detail in co-pending Coeling et al. application Ser. No. 183,266, filed Sept. 2, 1980, now abandoned, and in the above-identified U.S. Pat. No. 3,708,240.

A non-metallic arm 33 extends from the rear of the rotary atomizer coater 10 and is used in mounting the coater 10 to the arm of an industrial robot or, in the alternative, to a stationary mounting. A flexible conduit 34 is connected to the rear end of the rear housing assembly 13 and carries a plurality of paint hoses, air hoses and an electrical cable. A turbine air hose 36 is connected to an annulus 37 which is an integral part of the rear housing assembly 13. The annulus 37 defines a passageway 38 which is in communication with the air turbine 30 through a rear seal assembly 39.

Figure 8:
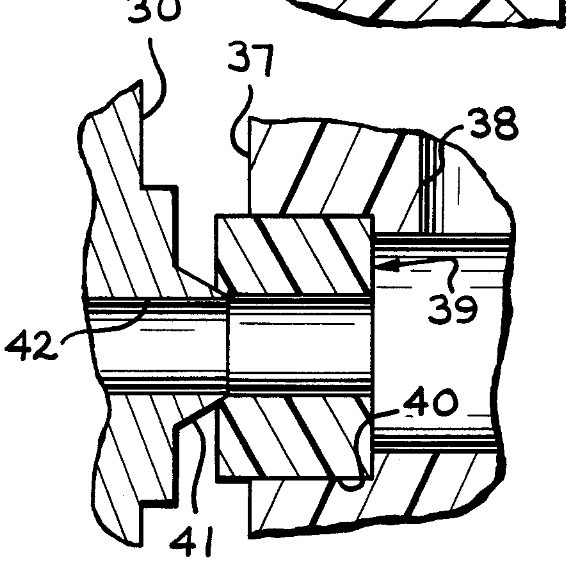
FIG. 8 is a fragmentary, enlarged cross-sectional view similar to FIG. 7, showing the rear seal assembly.

Referring to FIG. 8, the rear seal assembly 39 includes a cylindrical seal member 40 constructed of a plastic material, such as Nylon or the like. A metallic cutting lip 41 is defined on the rear of the air turbine 30. The cutting lip 41 abrades the cylindrical seal member 40 to melt the plastic material and provide a positive seal. The turbine 30 and the rear seal assembly 39 define an air passageway 42 communicating with the annulus passageway 37 and the air hose 36.

The remaining hoses and cables within the flexible conduit 34 are directed through the shroud and terminate in the manifold assembly 14. For example, referring to FIG. 3, solvent hose 45 terminates at the manifold assembly 14 and communicates with a passageway 46 which leads to a solvent discharge nozzle 47. The solvent discharge nozzle 47 introduces solvent to the rotary bell 27 during cleaning.

Figure 5:
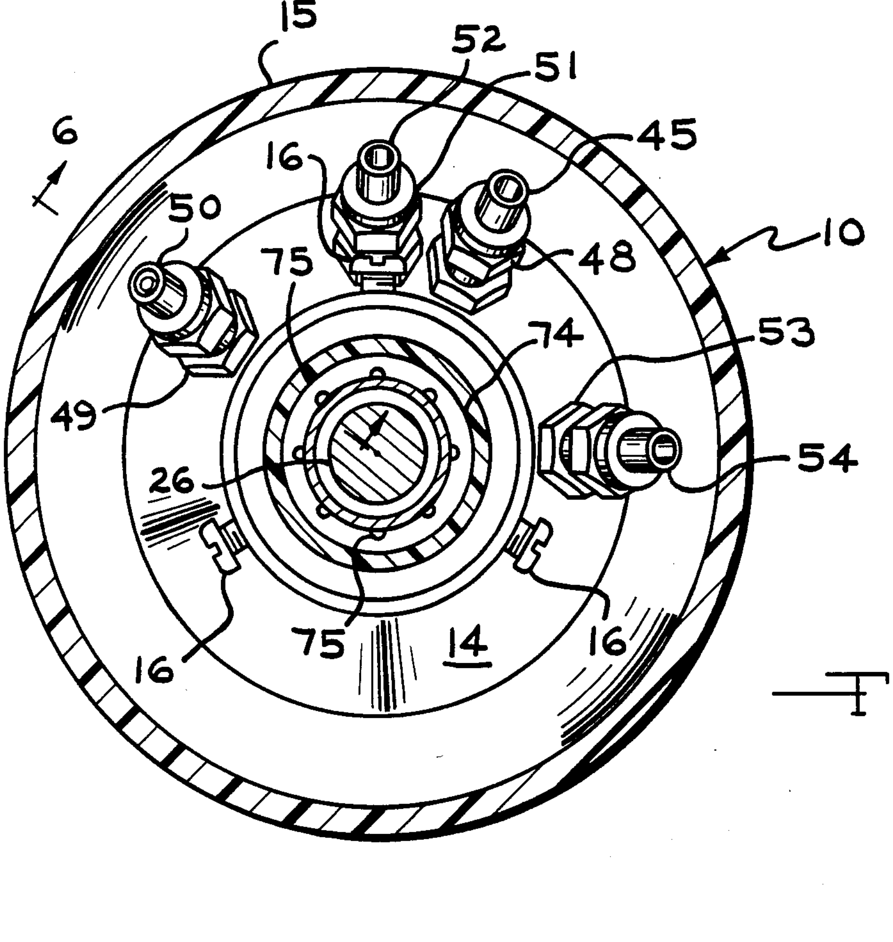
FIG. 5 is a cross-sectional view taken along the line 5—5 of FIG. 3.

The solvent hose 45 is connected to the manifold assembly 14 by a solvent fitting 48, which is best shown in FIG. 5. A fitting 49 connects an electrical cable 50; a fitting 51 connects a paint hose 52; and a fitting 53 connects a shaping air conduit 54.

Referring to FIG. 3, a front plate annulus plate 56 is mounted on the front end of the manifold assembly 14 and defines a shaping air passageway 57 which is in communication with the shaping air conduit 54. A plurality of radially spaced shaping air openings 58 direct clean shaping air at predetermined locations outwardly along the rotary bell 27. Similarly, the paint tube 52 is in communication with a series of paint openings 60 which direct paint to the interior surface of the rotary bell 27.

Figure 4:
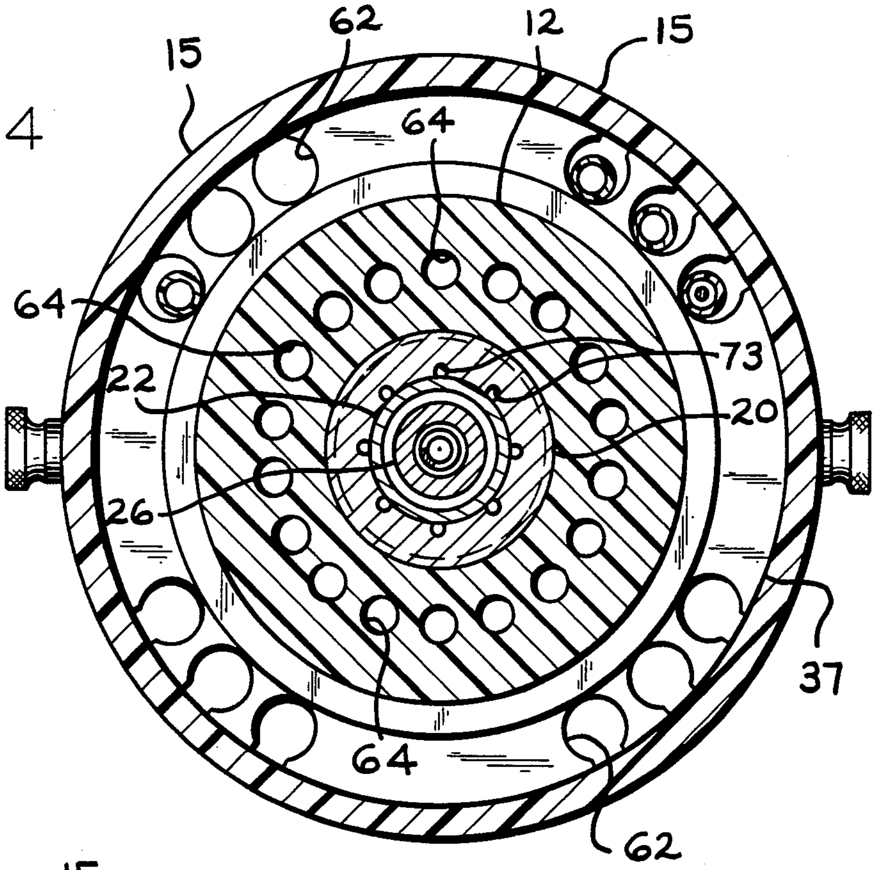
FIG. 4 is a cross-sectional view taken along the line 4—4 of FIG. 3.

Referring to FIGS. 2 and 4, a plurality of peripheral openings 62 are provided in the annulus 37 of the rear housing assembly 13. The solvent tube 45, the electrical cable 50, the paint hose 52 and the shaping air conduit 54 are positioned within certain ones of the peripheral openings 62. The remaining peripheral openings 62 and portions of the peripheral openings 62 which have received the tubes and cables also serve as exhaust turbine air passageways leading outwardly to the flexible conduit 34.

Referring to FIGS. 2, 3 and 4, after air is exhausted from the turbine 30 into reaction chamber 63 defined in the front housing assembly 12, it is directed into passageways 64 leading to a muffler chamber 65 which includes a fibrous muffler material. A pressure disk 66 which defines a plurality of openings 67 is positioned within the muffler chamber 65. The pressure disk 66 forms an exhaust air back pressure within the passageways 64. Normally the back pressure desired is in the order of 1 p.s.i.g. A portion of the exhaust gas passes through the openings 67 into a chamber 69 defined between the housing assembly 11 and the shroud 15. The exhaust gas pressure within the shroud prevents the entrance of paint particles and other undesirable particles from entering the shroud. The majority of the exhaust gas then moves rearwardly through the peripheral openings 62 in the annulus 37 and is exhausted rearwardly through the flexible conduit 34.

In one embodiment, auxiliary shaping air outlets 70 (See FIG. 3) extend from the chamber 69, through the manifold assembly 14 and through the front annulus plate 56. These auxiliary shaping air outlets 70 are spaced outwardly from the first shaping air outlets or openings 58. Rather than using makeup air, a portion of the exhaust air is exhausted through the auxiliary shaping air outlets 70 to retard and block the paint particles and solvent particles from moving rearwardly along the shroud 15.

Referring to FIGS. 3 and 4, the support collar 20 defines a plurality of passageways 73 which are immediately adjacent the outer wall of the sleeve 22. The passageways 73 are in communication with a chamber 74 defined between the front end of the front assembly 12 and the outer wall of the sleeve 22. The front end of the front housing assembly 12 defines a plurality of openings 75 (FIGS. 3 and 5) which are in communication with the chamber 74 and a seal chamber 76, which is defined by the manifold assembly 14. The passageways 73, the chamber 74 and the seal chamber 76 define a seal air passageway extending between the turbine air exhaust chamber 63 and a seal assembly 79. A portion of the pressurized exhaust air travels through this air passageway system and cools the front and rear bearings 24 and 25.

Figure 7:
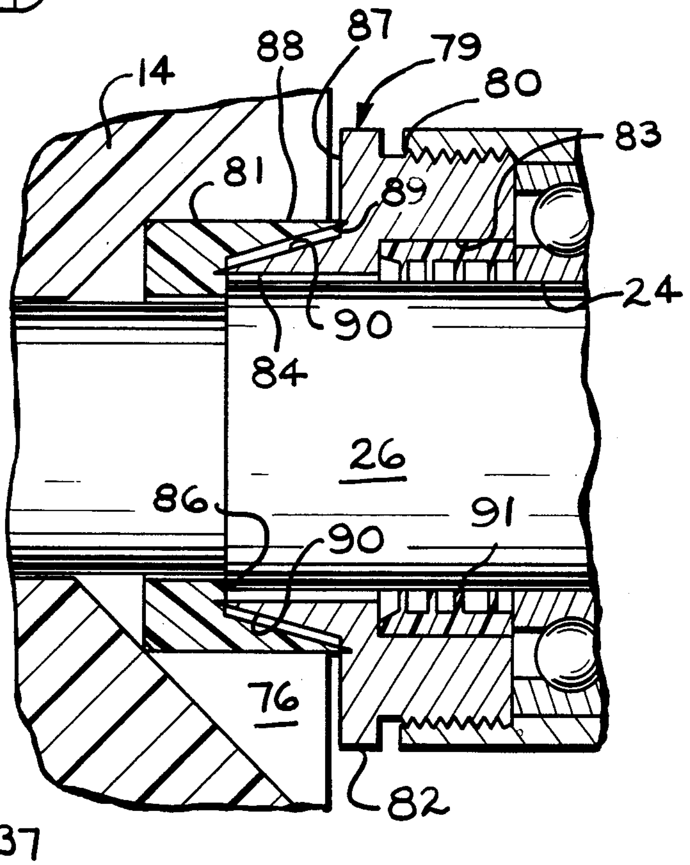
FIG. 7 is an enlarged fragmentary, cross-sectional view showing the seal assembly for the front bearing.

Referring to FIGS. 2, 3 and 7, a seal assembly 79 is positioned between the rotary atomizer or rotary bell 27 and the front bearings 24. The seal assembly 79 includes a cylindrical bearing cover 80 and a mating cap member 81. In the present embodiment the bearing cover 80 is constructed of metal while the cap member 81 is constructed of a plastic such as Delrin or Nylon. The bearing cover 80 includes an integral nut shaped portion 82, a cylindrical recess 83 adjacent the shaft 26 and a forwardly extending circular cutting edge 84.

In the present invention, the cap member 81 defines a circular sealing shoulder 86. The cutting edge 84 of the bearing cover 80 engages and abrades into the seal shoulder 86 of the cap member 81 during assembly, as shown in FIG. 7. In the present embodiment the bearing cover 80 also includes a circular surface 87 and the cap member 81 includes a cylindrical outer wall 88 having a tapered end 89.

During assembly, the tapered end 89 is crushed against the circular surface 87 of the bearing cover 80 to engage and seal the members. The bearing cover 80 and the cap member 81 define an outwardly inclined slinger chamber 90. If undesirable material enters the slinger chamber 90, such material is urged outwardly. A secondary axial seal 91, in this case an axial labyrinth seal 91 ispositioned within the cylindrical recess 83 adjacent the front bearing 24.

The positive pressure within the seal chamber 76, which has been pressurized with exhaust air, coupled with the primary seal assembly 79 including the secondary axial seal 91 retards the passage of paint particles, solvent and solvent fumes along the shaft 26 to the front bearing 24 during the high speed rotation of the shaft 26. This sealing system provides a much higher bearing life and therefore a much longer operating life for the rotary atomizer coater.

Figure 6:
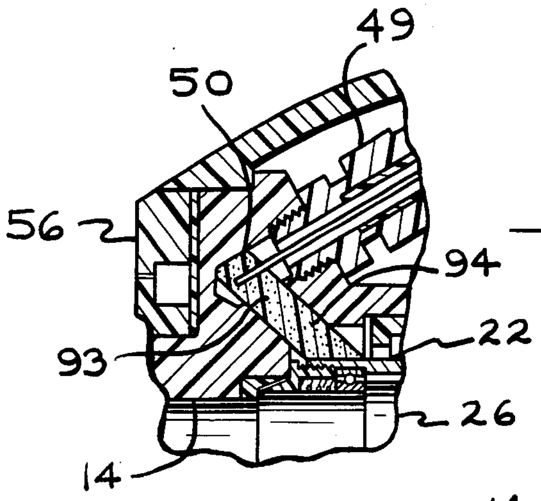
FIG. 6 is a fragmentary, cross-sectional view taken along the line 6—6 of FIG. 5 showing the electrical connection.

Referring to FIG. 6, the electrical cable 50 terminates and is in electrical communication with a foamed resin block 93. The foamed resin block includes a plurality of conductive particles 94, for example graphite particles. The foam resin block 93 engages the metallic sleeve 22 which is in electrical communication with the rotating shaft 26. The shaft 26 is in communication and electrically charges the rotary bell 27 to between 40 KV and 100 KV.

Various modifications and changes may be made in the above-described preferred embodiment of the invention without departing from the spirit and the scope of the following claims.

What we claim:

1. A coating applicator comprising, in combination, a rotary atomizer mounted on a shaft, drive means operatively connected to said shaft to rotate said shaft at high speeds, means for supplying coating material to said rotary atomizer, a pair of spaced bearings rotatably mounting said shaft and a seal assembly between said rotary atomizer and one of said bearings, said seal assembly including a cylindrical bearing cover, said bearing cover including a circular cutting edge adjacent said shaft, and a mating cap member surrounding said shaft adjacent said bearing cover, said cap member defining a circular sealing shoulder, said cutting edge of said bearing cover engaging and abraiding into said sealing shoulder, whereby coating material is sealed from said one of said bearings, said bearing cover including a circular surface extending outwardly and said cap member including a cylindrical outer wall having a tapered rear end, said tapered rear end engaging said circular surface of said bearing cover.

2. A coating applicator, according to claim 1, wherein an axial seal is positioned between said bearing cover and said shaft.

3. A coating applicator, according to claim 1, wherein said bearing cover and said cap member define an outwardly inclined slinger chamber.

4. A coating applicator, according to claim 1, wherein said drive means comprises an air driven turbine, and said applicator defining an entrance air passageway and an exhaust air passageway, said coating applicator defining a seal air passageway in communication with said turbine and said seal assembly, whereby a portion of such exhaust air can be directed into such seal air passageway to pressurize such seal assembly and means for establishing a positive pressure in said seal air passageway.

5. A coating applicator, according to claim 1, including a cylindrical muffler chamber in communication with such exhaust air passageway for receiving such exhaust air, and wherein said positive pressure means comprises a pressure disk positioned adjacent said muffler chamber.

6. A coating applicator, according to claim 1, wherein said coating applicator includes first shaping air outlets for receiving shaping air and directing such shaping air adjacent said rotary atomizer and auxiliary shaping air outlets spaced outwardly from said first shaping air outlets, said auxiliary shaping air outlets being in communication with such exhaust air from said turbine.

7. A coating applicator, according to claim 1, wherein said shaft and said bearings are positioned within a non-metallic housing assembly, said housing assembly being positioned within a non-metallic shroud.

8. A coating applicator comprising, in combination, a rotary atomizer mounted on a shaft, drive means operatively connected to said shaft to rotate said shaft at high speeds, means for supplying coating material to said rotary atomizer, a pair of spaced bearings rotatably mounting said shaft and a seal assembly between said rotary atomizer and one of said bearings, said seal assembly including a cylindrical cover, said cover including a circular cutting edge adjacent said shaft, and a mating cap member surrounding said shaft adjacent said cover, said cap member defining a circular sealing shoulder, said cutting edge of said cover engaging and abraiding into said sealing shoulder, said cap member and said cover defining adjacent surfaces forming an outwardly inclined slinger chamber and an axial seal mounted by said cover adjacent said shaft.

9. A coating applicator, according to claim 8, wherein said shaft and said bearings are positioned within a non-metallic housing assembly, said housing assembly being positioned within a non-metallic shroud.

* * * * *